United States Patent [19]

Robey

[11] 4,023,506

[45] May 17, 1977

[54] SYSTEM AND PROCESS FOR PROVIDING DURABILITY ENHANCED AREA

[75] Inventor: Melvin J. Robey, West Lafayette, Ind.

[73] Assignee: Purdue Research Foundation, West Lafayette, Ind.

[22] Filed: Mar. 8, 1976

[21] Appl. No.: 664,865

[52] U.S. Cl. .................... 111/1; 47/56; 61/11; 272/3; 47/26
[51] Int. Cl.² .................................. A01G 7/00
[58] Field of Search ......... 61/11; 47/56, 26, 25, 47/1; 111/1; 272/3, 56.5 SS

[56] References Cited

UNITED STATES PATENTS

| 2,605,589 | 8/1952 | Kuestner | 47/56 |
| 2,899,775 | 8/1959 | Partin | 47/1 |
| 3,845,584 | 11/1974 | Mercer | 47/56 |
| 3,863,388 | 2/1975 | Loads | 47/56 |
| 3,905,313 | 9/1975 | Grether | 47/56 X |
| 3,908,385 | 9/1975 | Daniel et al. | 61/11 |
| 3,922,409 | 11/1975 | Stark | 47/26 X |

FOREIGN PATENTS OR APPLICATIONS

| 1,126,663 | 3/1962 | Germany | 47/56 |
| 1,801,460 | 4/1970 | Germany | 47/56 |
| 2,160,576 | 6/1973 | Germany | 61/11 R |
| 2,311,028 | 9/1973 | Germany | 47/56 |
| 2,348,876 | 4/1974 | Germany | 47/56 |

Primary Examiner—Robert E. Bagwill
Attorney, Agent, or Firm—John R. Nesbitt

[57] ABSTRACT

A system and process is disclosed for providing a durability enhanced area that is particularly well suited for use as an athletic playing field. A vegetative crop has one or more layers of netting associated therewith so that each layer of netting has portions of the vegetative crop extending therethrough. With grass utilized as the vegetative crop and the growing points of the grass within a rooting medium, the blades of the grass extend upwardly through a top layer of netting contiguous to and above the rooting medium to protect the growing points of the grass and to prevent excessive divoting when the area is used as an athletic playing field. A second layer of netting is positioned below the rooting medium so that the roots of the grass extend therethrough to give the turf the support strength that is particularly required where the area is used as an athletic playing field for playing a game such as football. Additional layers of netting may be utilized where needed or desired. The system is particularly suitable for use with a planted surface having an underground conditioning system, and may also be utilized to replace or repair selected portions of an area.

13 Claims, 10 Drawing Figures

4,023,506

SYSTEM AND PROCESS FOR PROVIDING DURABILITY ENHANCED AREA

FIELD OF THE INVENTION

This invention relates to a durability enhancing system and process and, more particularly, relates to a system and process for enhancing the durability of an athletic playing field.

BACKGROUND OF THE INVENTION

Areas that are intended for heavy use often are found to be unsuitable for such use at least over an extended period. This is true, for example, in the case of some athletic playing fields, including well known fields such as used for baseball and football.

Outdoor ahletic surfaces are often exposed to tremendous usage in all kinds of weather and this leads to destruction of the grassy surface particularly where and under adverse weather conditions such as rainy weather is encountered. Not only is the grass worn off of the area, divots can also be ripped out of the field, and under these conditions, it is obviously more difficult to play the game as intended as well as increasing the risk of player injury.

While artificial surfaces have been suggested and utilized, these surfaces have not proved to be completely suitable and various improved natural grass surfaces have therefore been suggested and utilized.

An underground irrigation system for a particular planted field has been developed and is described in U.S. Pat. No. 3,908,385 issued Sept. 30, 1975. This system has reduced the problems of conventional natural grass fields by removing excess moisture and/or providing moisture when needed. It has been found, however, that this type of field, as well as any other natural grass field, could be further improved by improving the durability or wearability of the field.

With respect to durability of a grass field, it has been found that when a field is used excessively (i.e. on the order of twenty or more times in a three month period), the grass becomes worn to such an extent that the field is unsuitable for use.

As the grass becomes worn or is torn out as can commonly occur, for example, by the cleats of a football player, the underneath layers (soil) become exposed and this allows the field to become muddy and/or sloppy. When a particular surface utilizes sand under this turf, a muddy field can be avoided but the danger of penetration of the foot of a player is still present, and hence improvement of the turf is therefore desirable even with this type of surface.

In addition, while it has been suggested that particular selected areas of grass fields could be replaced, such replacement has not proven to be completely successful, particularly if early use is required.

SUMMARY OF THE INVENTION

This invention provides durability enhancement to an area having a vegetative crop threat. For an athletic playing field having natural grass, the system of this invention protects the grass and strengthens the turf so that the field is maintained in good condition even though subjected to heavy use. When combined with a field having a surface conditioning system, the resulting field is optimized for heavy use without development of undesirable playing conditions.

It is therefore an object of this invention to provide a durability enhanced area.

It is another object of this invention to provide a durability enhanced area that is well suited for heavy use as an athletic playing field.

It is still another object of this invention to provide a system and process for enhancing the durability of an area.

It is yet another object of this invention to provide a system and process for enhancing the durability of an area in conjunction with a surface conditioning system.

It is still another object of this invention to provide a durability enhancing system that includes apertured means through which portions of a vegetative crop extend.

It is yet another object of this invention to provide a durability enhancing system that includes one or more layers of netting through which portions of a vegetative crop extend.

It is still another object of this invention to provide a durability enhancing system that includes a layer of netting above the growing points of grass in a rooting medium to thus protect said grass.

It is still another object of this invention to provide a durability enhancing system that includes a layer of netting below the growing points of grass in a rooting medium to strengthen the turf thereabove.

It is yet another object of this invention to provide a process for enhancing the durability of an area having a vegetative crop thereat.

It is yet another object of this invention to provide a provide a process for enhancing the durability of a natural grass athletic playing field.

It still another object of this invention to provide an improved system and process for replacing selected portions of an area.

It is yet another object of this invention to provide a system and process for replacing selected portions of an athletic playing field with sections that have been durability enhanced.

With these and other objects in view which will become apparent to one skilled in the art as the descriptiion proceeds, this invention resides in the novel construction, combination, and arrangement of parts substantially as hereinafter described, and more particularly defined by the appended claims, it being understood that such changes in the precise embodiments of the hereindisclosed invention are means to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
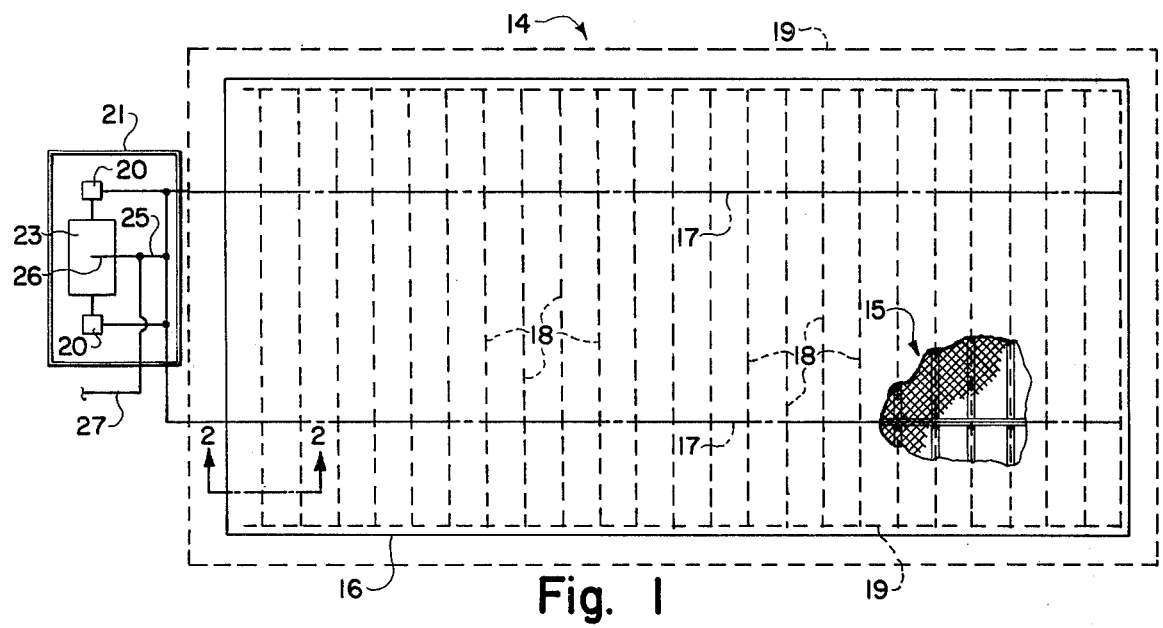
FIG. 1 is a top view of an athletic playing field that includes the durability enhancing system of this invention utilized in conjunction with a surface conditioning system.

Referring now to FIG. 1, the numeral 14 indicates generally an area such as an athletic playing field, for example, having the durability enhancing system 15 of this invention incorporated therein. The athletic playing field may be, for example, a field for playing a sport such as football or baseball. It is to be realized, of course, that the invention is intended for use with any type of area that is intended for heavy use.

The athletic playing field indicated in FIG. 1 is a field that includes a planted surface conditioning system such as described in U.S. Pat. No. 3,908,385, issued Sept. 30, 1975, and assigned to the assignee of the present invention. While this invention is useful with such a field, the invention is not meant to be limited thereto and can be utilized in other areas including natural grass areas receiving high usage.

As indicated in FIG. 1, athletic playing field 14 may be a football field the perimeter of which is indicated by the numeral 16 and has, beneath the surface, main collector drains 17 which are interconnected with lateral drains 18. Lateral drains 18 may be, for example, of porous material such as slitted type drains. Perimeter drains 19 may also be provided, both connected and not connected to lateral drains 18, as desired.

Collector drains 17 are connected at one end to pumps 20 at a pumping station 21. A drain 23 is provided at the pumping station to drain away water pumped from the field. A separate line 25 connected through suitable valving (not shown) can also be provided to connect the drain system with a gravity drain line 26 or to supply water to the field through water inlet line 27 connected to a source of water under pressure (not shown). Such a pumping and irrigating system is described in greater detail in U.S. Pat. No. 3,908,385.

Figure 2:
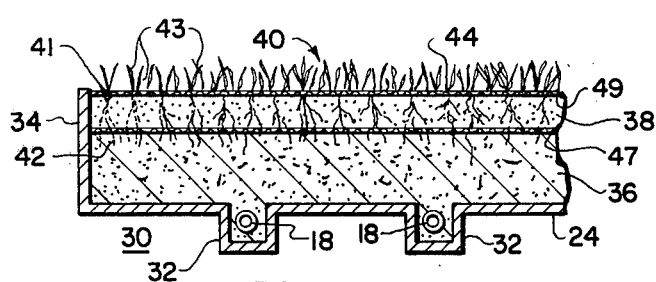
FIG. 2 is a cross-sectional view taken along lines 2—2 of FIG. 1.

The particular field shown in FIG. 1 is a prepared field that rests on subsoil base 30 as indicated in FIG. 2. As shown, lateral drains 18 are placed in lateral trenches 32 which are dug at desired spacings (also not shown, collector drains 17 are likewise placed in collector trenches).

A waterproof layer 34 is placed on top of the subsoil base 30 (inclding around the trench areas) and is carried up to the surface at the perimeter of the field as shown in FIG. 2. This forms a continuous watertight barrier.

Above the watertight barrier 34 is a layer of uniform porous medium 36, such as sand, which typically has a depth of about twelve inches. Above the porous medium 36 is a rooted medium area 38 which is comrised of substantially noncompactable materials and may be comprised of a mixture such as described in U.S. Pat. No. 3,908,385, as may be the remainder of the layers utilized in the particular field described.

A vegetative crop 40, typically grass, has its growing points 41 (rhizomes, stolons, and grass crowns) in the rooting medium as indicated in FIG. 2 with the roots 42 extending into the porous medium layer and the blades, or stems, 43, extending upwardly above the field surface 44 to furnish the vegetative crop covering the field surface.

Figure 3:
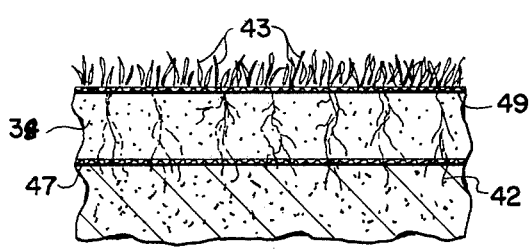
FIGS. 3 through 6 are typical representations of different embodiments of the durability enhancing system of this invention.

The durability enhancing system of this invention is particularly useful with the field above described. One or more layers of netting are utilized to enhance the durability of the field. As indicated in FIGS. 2 and 3, a first layer 47 of netting (or other material having apertures therein) is placed between the rooting medium 38 and the porous medium 36 so that the roots 42 of grass extend through the netting and become entwined therein. In addition, a second layer 49 of netting is positioned at the top of rooting medium 38 so that the blades 43 of grass extend through the netting and may also become entertwined therewith. The top layer 49 of netting is intended primarily to protect the growing points of grass (or other vegetative crop) from injury and to prevent excessive divoting. The lower layer 47 of netting is primarily intended to give the turf the necessary strength that is required to support the contemplated loads (such as heavier football players, for example, on a football field).

Figure 4:
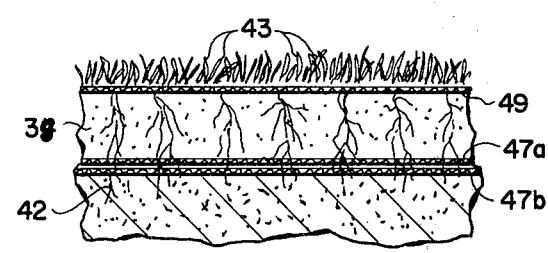
Figure 5:
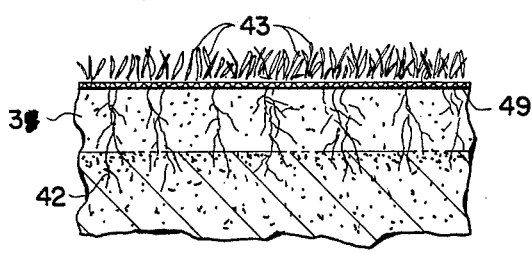

If desired more than one layer of netting can be utilized both above and/or below the rooting medium. As shown in FIG. 4, two layers 47 of netting 47a and 47b are utilized between the rooting medium and the sand or soil with the roots 42 of the grass extending through both layers of netting. Also, if desired, or if necessary for example when a field of grass already exists (which may or may not utilize a system having drainage or a porous medium layer) only a single layer 49 of netting may be utilized as indicted in FIG. 5 with the blades 43 of grass extending through this layer of netting. Likewise, if desired, a single layer of netting 47 could be utilized without layer 49.

Figure 6:
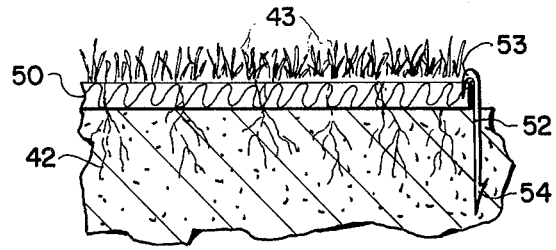
Figure 7:
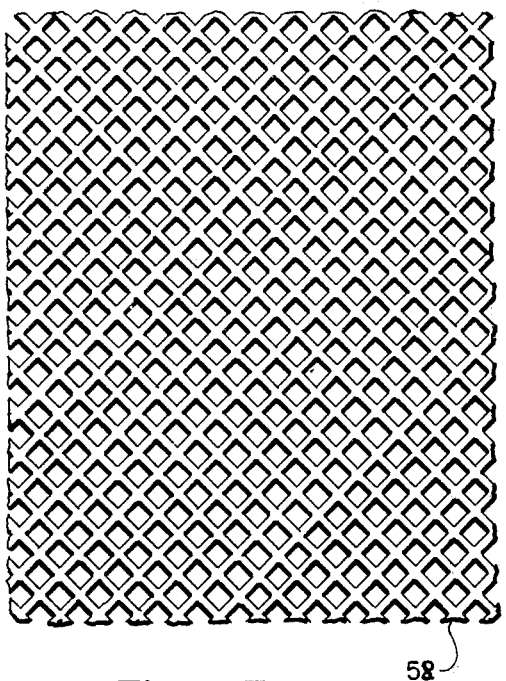
FIGS. 7 through 10 are typical representations of different types of netting that can be utilized in this invention.
Figure 8:
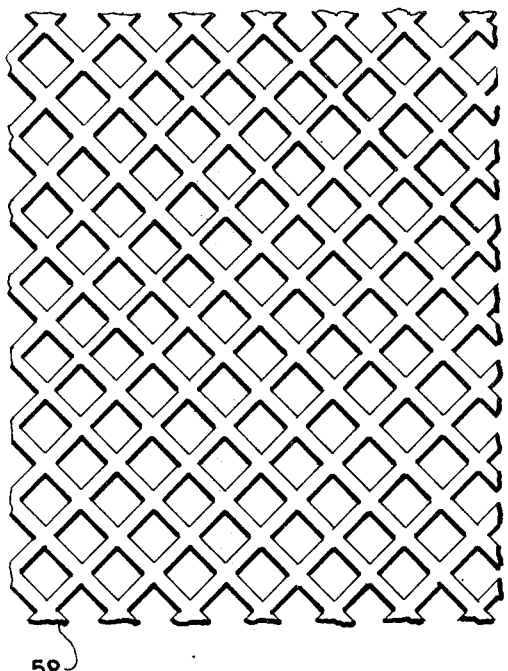
Figure 9:
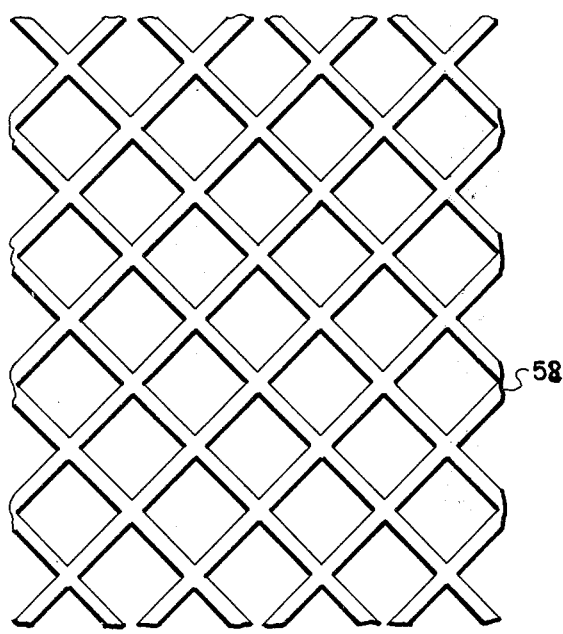
Figure 10:
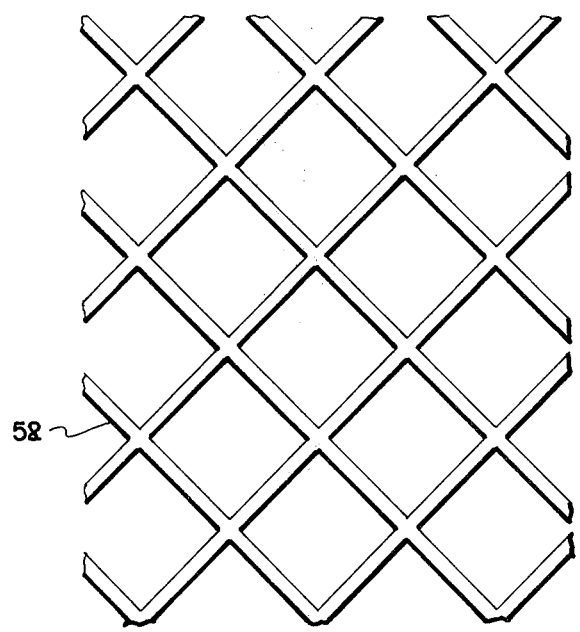

The thickness of the layer of netting can be varied as needed but must not interfere with the intended usage of the area. Likewise the positioning of the netting must be such so as not to interfere with the intended usage. As indicated in FIG. 6, a layer 50 of material could be utilized with a sufficient thickness that the growing points of the grass could be contiguous to or within the layer if desired. It has been found, however, that the grassy points contiguous to but below a thin layer of netting material is preferred with the blades 43 of grass extending through the layer.

As also indicated in FIG. 6 (and this would be applicable to the uper netting layer of FIGS. 1 through 5) positioning means 52 can be utilized to hold the durability enhanced portion of an area in position. As indicated, the positioning means includes one or more (preferably a plurality) of hooks having hooked end 53 engaging the layer of netting (49 or 50) and an anchoring end 54 embedded in the soil or sand. The hooks may be spaced about an area to be held in position utilizing as many hooks as deemed necessary or desirable. Each hook may be formed of small diameter material with the hooking end and anchor end being bent in opposite directions as shown in FIG. 6.

The netting utilized for each layer 47 and 49 may be of any suitable size and weight as indicated by the representative showing of FIGS. 7 through 10. As shown, for example, the netting may have ⅛ inch openings (FIG. 7), ¼ inch openings (FIG. 8), ½ inch openings (FIG. 9), or ¾ inch openings (FIG. 10) with the webbing, or solid parts 58 being of corresponding dimensions to provide a sturdy product. It has been found that a netting made up of non-biodegradable material is preferred and it has been found that a netting of synthetic material manufactured by DuPont and marketed under the name "Vexar" has provided a netting that is sufficiently tough and durable to be utilized in this invention. Other materials, using rubber, plastic, nylon or the like, could also be utilized.

The netting selected for layer 49 (top layer) must, of course, have openings small enough to prevent footwear or the like from being entangled therein. For example, when used on a football field, the openings in the netting must be small enough to prevent a cleat from penetrating and becoming caught in the netting. With respect to layer 47 (bottom layer), the openings must be sufficiently small to allow roots to grow therethrough and be prevented from easy separation from the layer.

On the other hand, the openings in the layers must be sufficiently large to allow grass blades and roots to extend therethrough, to allow soil or sand to filter therethrough, to allow oxygen to diffuse down into the root zone, and to allow free movement of water and nutrients to the roots. As can be appreciated, the size of apertures and the thickness of the layer can thus be altered as desired for any particular usage.

With respect to the various netting arrangements shown in the drawings, the embodiment shown in FIG. 3 is formed with the layer 47 of netting first placed on the soil or sand. Grass is then started growing on the layer 47 with the rooting medium thus above the layer 47. Layer 49 of netting is then placed on top of the grass above the growing points of the grass. Thus the turf is sandwiched between the layers of netting and creates a very durable area. For added strength, as shown by the embodiment of FIG. 4, a pair of layers 47a and 47b could be first placed on the sand or soil and the turf formed in this same manner as described hereinabove. A single layer 47 might be utilized, for example, for a high school or college football playing field, while dual layers 47a and 47b might be utilized, for example, for a professional football field. The embodiment shown in FIG. 5 would be applicable for a previously installed grass field and could be used with any grass field.

As can be appreciated, selected portions of an area can be replaced by sections formed according ro this invention. In so doing, sections (for example sections 6×6) of turf are simply placed in the portion to be replaced and, if desired, such sections can be held in place by the fastening means as indicated in FIG. 6. The area is then ready for use without the necessity of a delay as is necessary when replacing with regular sod, for example.

As can be seen from the foregoing, this invention provides a novel system and process for enhancing the durability of an area such as an athletic playing field.

What is claimed is:

1. An area having a durability enhanced surface intended for heavy use, said area comprising:
    a base;
    a rooting medium above and supported by said base;
    a vegetative crop at the surface of said area, said vegetative crop having growing points in said rooting medium, blades extending upwardly from said growing points, and roots extending downwardly from said growing points;
    first apertured means contiguous to and below said rooting medium and having said roots of said vegetative crop extending through the apertures in said first apertured means; and
    second apertured means contiguous to and above said rooting medium and having said blades of said vegetative crop extending through the apertures in said second apertured means with said apertured means being positioned and configured so as not to impede use of said area in the intended manner.

2. The area of claim 1 wherein said apertured means includes separated layers of net-like material at opposite sides of said rooting medium.

3. The area of claim 2 wherein said area includes a third layer of said net-like material contiguous to and below said second layer to provide added strength to said area.

4. The area of claim 1 wherein said base is sand that extends up to said rooting medium, and wherein said area includes a waterproof layer below said base and drainage means above said waterproof layer, said apertured means allowing drainage of said surface therethrough.

5. A durability enhancing system for a surface area having a vegetative cover crop with the surface area being subjected to heavy use and said vegetative cover crop including a rooting medium having blades extending upwardly and roots extending downwardly therefrom, said system including first net means at one side of said rooting medium of said vegetative cover crop and having said roots of said vegetative cover crop extending therethrough, and said system also including second net means at the other side of said rooting medium of said vegetative cover crop and having said blades of said vegetative cover crop extending therethrough with said net means being positioned and configured so as not to impede use of said surface area in the intended manner.

6. The system of claim 5 wherein said first net means includes a layer of net-like material adjacent to said surface area and wherein said net-like material has openings sufficiently small to prevent penetration by any portion of footwear worn by a player utilizing said playing field.

7. The system of claim 5 wherein said vegetative cover crop is grass having growing points in said rooting medium.

8. An athletic playing field having a durability enhanced surface area that is intended for heavy use, said playing field comprising:
    a compacted subsoil base;
    a waterproof layer above and adjacent to said base;
    drainage means above and adjacent to said waterproof layer;
    a uniform porous medium adjacent to drainage means and extending upwardly therefrom;
    a rooting medium adjacent to and above said uniform porous medium, the top portion of said rooting medium providing a surface area;
    grass having growing points in said rooting medium with blades extending upwardly from said rooting medium to provide a grass cover at said surface area and roots extending downwardly into said uniform porous medium; and
    first and second layers of netting one of which is contiguous to said surface area and has said blades of grass extending therethrough and the other of which is adjacent to and below said rooting medium and has said roots of grass extending therethrough, said layers of netting providing protection to the growing points of said grass and enhancing the stability of said athletic playing field.

9. The athletic playing field of claim 8 wherein said field includes a third layer of netting adjacent to one of said first and second layers of netting.

10. The athletic playing field of claim 8 wherein said field includes a plurality of hooks one end of each of which is fastened to said layer of netting contiguous to said surface area and the other of each of which is anchored into said uniform porous medium.

11. A method for enhancing the durability of turf at an area receiving heavy use, said method comprising:
  selecting a layer of netting having a configuration to not impede the intended use of the area in which said netting is positioned;
  placing in said area a first layer of said selected netting with said netting being positioned above said rooting medium of said turf so that the blades of said turf extend through said netting; and
  placing a second layer of netting below said rooting medium so that the roots of said turf extend therethrough.

12. A method for enhancing the durability of turf at an area receiving heavy use, said method comprising:
  placing a first layer of net-like material on a base;
  growing grass above said first layer of net-like material and allowing said grass to grow so that the roots of said grass penetrate said first layer of said net-like material with the growing points of said grass being above said first layer of net-like material; and
  placing a second layer of net-like material above the growing points of said grass so that the blades of said grass extend through said second layer of net-like material whereby the turf at said area is strengthened and protected.

13. The method of claim 12 wherein said method includes utilizing said area of durability enhanced turf to replace a portion of an athletic playing field whereby predetermined portions of said field are strengthened and protected.

* * * * *